United States Patent [19]

Tomita et al.

[11] Patent Number: 4,812,001

[45] Date of Patent: Mar. 14, 1989

[54] ANNEALING BENT OPTICAL FIBER

[75] Inventors: Akira Tomita, Redwood City; Mark Ostasiuk, Newark, both of Calif.

[73] Assignee: Raychem Corp., Menlo Park, Calif.

[21] Appl. No.: 78,356

[22] Filed: Jul. 28, 1987

[51] Int. Cl.⁴ .................................................. G02B 6/16
[52] U.S. Cl. .................................. 350/96.3; 350/96.23; 350/320
[58] Field of Search .................. 350/96.23, 96.3, 320; 65/102, 108

[56] References Cited
FOREIGN PATENT DOCUMENTS 61-26012 2/1986 Japan .................................. 350/96.23

Primary Examiner—John D. Lee
Assistant Examiner—John Ngo
Attorney, Agent, or Firm—Dennis E. Kovach; Herbert G. Burkard

[57] ABSTRACT

A method of forming an optical fiber elbow includes bending a straight optical fiber while subjecting the fiber to an elevated temperature for an amount of time sufficient to anneal strain out of the bent section of the optical fiber such that upon cooling the optical fiber maintains a bent attitude with little or no strain in the bend.

15 Claims, 2 Drawing Sheets

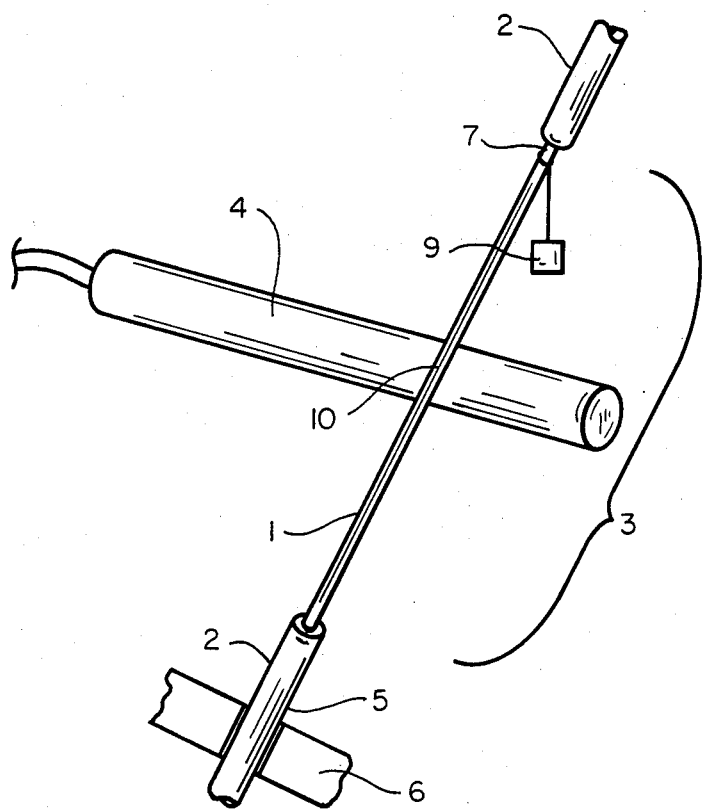
FIG_1

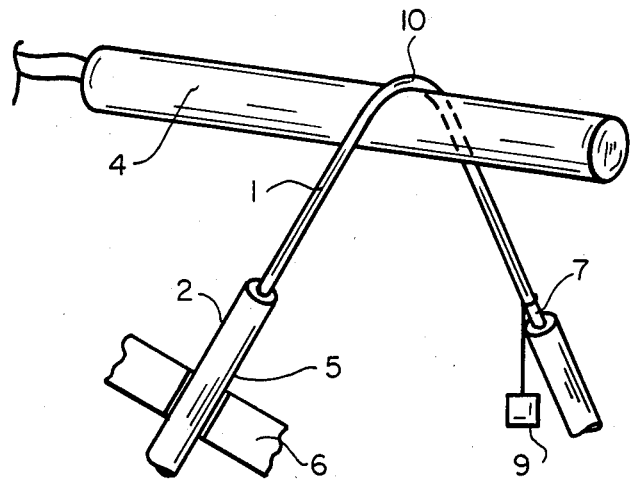
FIG_2
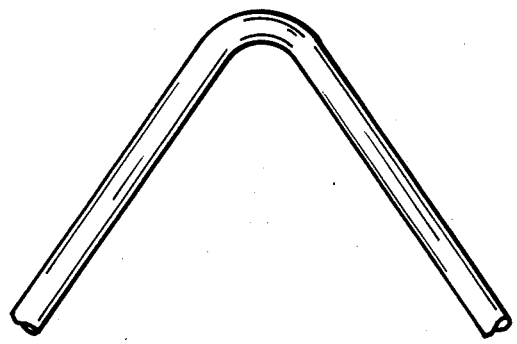
FIG_3

ANNEALING BENT OPTICAL FIBER

BACKGROUND OF THE INVENTION

The present invention relates to forming bent optical fibers, and optical fiber bends and elbows created thereby, so as to reduce static strain thereat, and hence is an improvement over the invention disclosed in copending Ser. No. 899,363 filed 22 Aug. 1986 (now abandoned), assigned to the assignee of the invention, the disclosure of which is incorporated herein by reference.

Optical fiber has recently been recognized as providing significant advantages over electrical conductors for information transfer. Accordingly, optical fiber has been extensively deployed through a variety of environments where information transfer is desired. In deploying optical fiber, it is often necessary that the fiber be bent, and a minimum bend radius about which the optical fiber can be bent is typically limited by static fatigue which causes the fiber to fracture in time. The minimum bend radius ($R_{min}$) for any given fiber is typically limited by a radius (r) of the fiber and a fiber proof test strain level ($\epsilon$), and is typically determined as follows:

$$R_{min} = 3r/\epsilon$$

where the factor of three comes from long-term static fatigue considerations. For typical optical fiber diameters of 125 microns, 140 microns, and 250 microns, respectively, $R_{min}$ is 1.87 cm, 2.1 cm and 3.75 cm. respectively, when $\epsilon$ equals 1.0% which corresponds to a 100 kpsi proof test stress. Such values for the minimum bend radius are often too large for practical applications, and consequently limit the use of optical fiber for high density interconnect systems and other applications where space is a premium and hence small fiber bend radii are required.

SUMMARY OF THE INVENTION

It is an object of the invention to provide a method for producing bent or curved optical fiber sections having a radius of curvature sufficiently small so as to be usable in applications requiring small bend radius and which are not subject to significant static fatigue strain.

It is a further object of the invention to provide curved optical fiber sections for use in applications requiring optical fiber with small bend radii.

These and other objects of the invention are achieved by forming a bent optical fiber by:

stressing an intermediate section of the optical fiber so as to create a bend in the fiber; and heating the bent intermediate section of an optical fiber at a temperature sufficient large and for an amount of time sufficiently long to remove at least some stress in the bend in the intermediate section of the optical fiber.

BRIEF DESCRIPTION OF THE DRAWINGS

FIG. 1 illustrates a method of forming a bent optical fiber elbow according to the invention;

FIG. 2 illustrates the optical fiber illustrated in FIG. 1 subsequent to being annealed; and FIG. 3 illustrates a recoated bent optical fiber formed using the method of FIGS. 1 and 2.

DESCRIPTION OF THE PREFERRED EMBODIMENTS

According to the invention, a minimum bend radius for an optical fiber is reduced by annealing a bent section of an optical fiber so as to minimize or eliminate any strain in the optical fiber at its bend section, which strain otherwise would cause the fiber to fracture in a relatively short period of time due to static fatigue. According to preferred embodiments, the optical fiber is annealed by maintaining the fiber at an elevated temperature while creating a bent section therein by use of an external stress, and maintaining the temperature and stress until substantially all the strain in the fiber bent section has been annealed out of the bent section, and then cooling the fiber bent section and removing the external stress. The fiber temperature is kept high enough to anneal the fiber within a reasonable time, but is kept low enough to prevent any detrimental deformation of the fiber or significant dopant defusion in the fiber. Preferably, the fabrication process takes place in an inert, dry environment, e.g. a nitrogen atmosphere, to prevent any degradation of fiber strength.

The invention is suitable for fabricating bends in any type of fiber, preferred embodiments including single mode and multimode fiber, both step and graded index, and is suitable for plastic clad glass core fiber as well as glass-on-glass fiber, e.g. fiber which includes a glass core surrounded by a glass cladding, preferred embodiments including fiber having a cylindrical core and a cylindrical cladding, preferably the glass comprising silica.

For glass-on-glass fiber, a protective coating, e.g. buffer and/or jacket, over the cladding is preferably removed prior to heating, and upon completion of the heat/bend/annealing treatment preferably a new coating is applied to the annealed bend. Typically, the coating which is removed from the fiber constitutes an acrylate or silicone fiber buffer.

To provide further physical protection, it is another advantageous feature of the invention to place the bent fiber between two halves of a bent tube subsequent to the heat/bend treatment. When the buffer is removed prior to annealing and a new protective coating is applied to the annealed bend subsequent to annealing, the new protective coating is preferably chosen so as to have an index of refraction which is less than that of the fiber cladding so as to minimize light loss at the bend, especially when a small bend radius is to be formed, such light loss being characteristic at small bend radii if an index matching coating is used. Alternatively, if undue light loss is not a concern and bandwidth is a concern, then preferably the new protective coating has an index of refraction higher than the cladding. In the case when the new coating is to have a low index of refraction, silicone having an index of refraction of 1.41 is suitable, and when the new coating is to have a high index of refraction, polyacrylate having an index of refraction of 1.48 is suitable, for example.

FIG. 1 illustrates one preferred method for carrying out one preferred embodiment of the invention. Referring to this figure, an optical fiber 1 having a polymeric coating, e.g. buffer 2, thereon has had a section of the buffer 2 removed from a section 3 of the optical fiber. Subsequently, the fiber section 3 is disposed over a cylindrically-shaped cartridge heater 4 having a radius of curvature which roughly corresponds to that desired to be formed on the optical fiber section 3. In order to fabricate a 90° bend section for the optical fiber, the buffer end 5 is fixedly retained by a fixture 6, while an opposite section 7 of the optical fiber has a small weight 9 attached thereto. While the cartridge heater 4 maintains the section 3 at an elevated temperature, the force of the weight 9 causes a section 10 of the optical fiber in contact with the cartridge heater 4 to bend, as illustrated in FIG. 2. Subsequent to annealing the fiber at an elevated temperature, the fiber is cooled, and substantially maintains its bent attitude, as illustrated in FIG. 3, with minimum internal strain at the bend.

Other embodiments are also possible. For example, the fiber can be heated in an oven with no contact being made to its bent section, or the fiber could be heated with a radiant heater.

EXAMPLE 1

Eleven samples of bare glass-on-glass optical fiber having a 200 micron core and 250 micron cladding diameter were prepared, and were disposed over a cartridge heater having a 3.17 mm radius, with buffer coated sections of the fiber samples being retained by a fixture such that the fiber formed a 45° angle with a horizontal. With the heater being maintained at a temperature of about 850° C. a light weight about 0.45 grams was attached to an unbuffered end of the fiber about three inches from the heater on an opposite side thereof from the buffer section. A 90° angle was soon formed in each of the 11 samples, and after about 45 seconds each of the samples was cooled and maintained its 90° bend without external stress being applied thereto. Without recoating, static fatigue aging of each of the samples was accelerated by disposing them in 80° C. water, and after 30 days none of the samples broke. Microscopic examination revealed a small amount of internal strain at the bends, and this strain could be further reduced by heating at a higher temperature and/or for a longer period of time. In contrast, the mean time for failure for the same fiber maintained bent about a similar radius in 80° C. water without being annealed by heat treatment according to the invention was about 10 minutes. Accordingly, the experiment confirmed that the invention can improve a lifetime of fiber by at least three orders of magnitude, even when the fiber is not recoated.

The invention as described can be used to permanently bend a much tighter radius in an optical fiber without a significant fear of static fatigue failure The technique for forming such fiber is useful in any application where space is limited, such uses being in transmitter/receiver units for optical communications, and also for various fiber optic sensors such as fiber gyroscopes. More importantly, the invention eliminates any strain in bent fiber which is responsible for static fatigue corrosion, and improves reliability of routed optical fiber drastically.

According to one preferred embodiment, a continuous length of optical fiber can be treated as described to create a bend in an intermediate section thereof, thus creating an elbow joint equivalent therein without the need for splicing. Such bends could be useful in routing fiber where tight corners need to be negotiated, or alternatively can be created at locations where a passive tap is to be disposed at a bend such as in ring or bus architectures, and preferably in any of the architectures described in pending U.S. application Ser. No. 754,035, filed July 11, 1985 (now U.S. Pat. No. 4,768,854), assigned to the assignee of the invention, the disclosure of which is incorporated herein by reference.

Alternatively, preferred embodiments include the formation of discreet elbow fiber connections which can be used to connect discreet sections of optical fiber lines around tight corners or wherever necessary, such elbow connections being deliverable to craftsmen in the field or personnel in assembly plants for connection, as desired. Preferably the annealing temperature is lower than a melting point of the material forming the fiber, for silicon the melting temperature being about 2000° C. Hence, for glass-on-glass silicon fiber, a temperature below 2000° C. is preferred, more preferably below 1600° C., more preferably below 1400° C., but yet the temperature should be maintained high enough to allow substantial annealing to take place in a reasonable amount of time, e.g. within seconds or minutes, a preferred temperature being above 500° C, more preferably above 700° C., e.g. 500° C. to 2000° C. or 600° C. to 1400° C., the invention including all combinations of the ranges of temperatures set forth above.

For a fiber having a radius of 62.5 microns, a bend of radius 4 mm creates a strain therein of 1.56%. For an elbow radius of 3 mm, the strain for such an untreated fiber is about 2.08%. In the example above, the strain in the untreated fiber was 3.94%. With the invention of annealing a bent elbow fiber section, the strain created at a bent section of the fiber by external stress can be substantially annealed to an extent such that the fiber maintains its bent attitude subsequent to removing the external stress, and even though some minimal finite amount of strain may still exist in the fiber bend region, it is not sufficient to cause the fiber to straighten, or fracture for a long period of time. The invention is usable for forming permanent elbow sections or fiber bent sections having a radius of curvature sufficiently small such that a strain which would otherwise exist in an untreated fiber would exceed 0.1%, alternatively would exceed 0.5%, alternatively would exceed 1.0%, and would even exceed 2.0%, 3.0%, 5.0% and even 8.0%. As indicated, it is highly desirable that the fiber be at its elevated temperature prior to beginning the bending operation.

Though the invention has been described by reference to specific embodiments thereof, the invention is not to be limited thereby and only by the appended claims.

We claim:

1. A method of forming a bent optical fiber, comprising the steps of:
    removing a buffer of an intermediate section of an optical fiber, the fiber comprising a glass core surrounded by a glass cladding, the glass comprising silica;
    stressing the intermediate section of the optical fiber so as to strain the fiber and create a bend; and
    heating the bent intermediate section of the optical fiber subsequent to removing its buffer at a temperature sufficiently large and for an amount of time sufficiently long to remove at least some strain in the bend of the intermediate section of the optical fiber such that the intermediate section remains bent when the stress is removed.

2. The method of claim 1, the fiber being heated so as to at least partially anneal the bent intermediate section.

3. The method of claim 2, the fiber being stressed so as to create a radius r and being annealed so as to substantially eliminate the strain in the bend to an extent such that the intermediate section is bent about a radius substantially equal to r when the stress is removed.

4. The method of claim 1, the intermediate section being bent subsequent to being heated.

5. The method of claim 1, further comprising the step of recoating the fiber with a material having an index of refraction lower than that of the cladding subsequent to the heating step.

6. The method of claim 1, further comprising the step of recoating the intermediate section of the optical fiber with a material having an index of refraction higher than that of the cladding subsequent to the heating step.

7. The method of claim 1, the fiber being annealed at a temperature between 500° C. and 2000° C.

8. The method of claim 7, the temperature being between 600° C. and 1400° C.

9. The method of claim 1, the fiber being heated in a dry inert environment.

10. The method of claim 1, the fiber being heated so as to anneal the fiber to an extent such that upon cooling and removing the stress the intermediate section of the optical fiber is bent about a radius which would produce a maximum strain in excess of 0.1% in a similar non-annealed bent fiber.

11. The method of claim 10, the radius being such so as to produce a maximum strain in excess of 1.0%.

12. The method of claim 10, the radius being such so as to produce a maximum strain in excess of 5.0%.

13. A bent optical fiber, comprising:
an optical fiber, the fiber including first and second straight sections interconnected by a bent section having a radius of curvature less than a minimum bend radius for the fiber, the bent section having been annealed during formation by heating with its buffer removed therefrom so as to reduce static strain thereat.

14. The optical fiber of claim 13, the bent section having been annealed to an extent such that when subjected to substantially no external stress the bent section is bent about a radius of curvature which would produce a maximum strain in excess of 0.5% in a similar non-annealed bent fiber.

15. The optical fiber of claim 14, the bent section having been annealed to an extent such that when subjected to substantially no external stress the bent section is bent about a radius of curvature which would produce a maximum strain in excess of 3.0% in a similar non-annealed bent fiber.

* * * * *